(No Model.)

W. EDERLE.
FEED TROUGH.

No. 512,368. Patented Jan. 9, 1894.

Witnesses:
George H. White
Fred J Taylor

Inventor.
Wendel Ederle
By Ithiel J. Cilley
Attorney.

UNITED STATES PATENT OFFICE.

WENDEL EDERLE, OF HOPKINS, MICHIGAN.

FEED-TROUGH.

SPECIFICATION forming part of Letters Patent No. 512,368, dated January 9, 1894.

Application filed October 19, 1893. Serial No. 488,653. (No model.)

*To all whom it may concern:*

Be it known that I, WENDEL EDERLE, a citizen of the United States, residing at the village of Hopkins Station, in the county of Allegan and State of Michigan, have invented certain new and useful Improvements in Feed-Troughs, of which the following is a specification.

My invention relates more particularly to improvements in troughs for use in feeding swine; and its objects are, first, to prevent the swine from putting their feet into the trough; second, to provide a trough with which each animal will have to enter a separate compartment to eat therefrom; third, to provide a feed-trough having a partition that may be shifted to lessen, or increase the capacity of the trough; and, fourth, to provide a feed trough having a close cover that, when open, will be converted into a slide to conduct the feed into the trough. I attain these objects by the mechanism illustrated in the accompanying drawings, in which—

Figure 1:
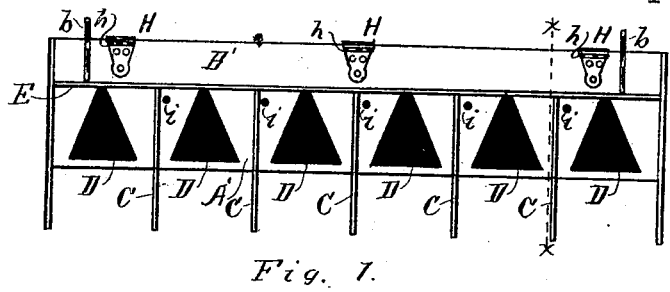
Figure 3:
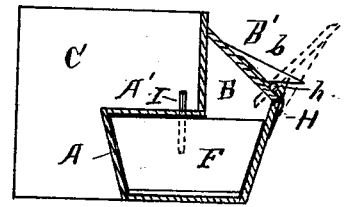
Figure 2:
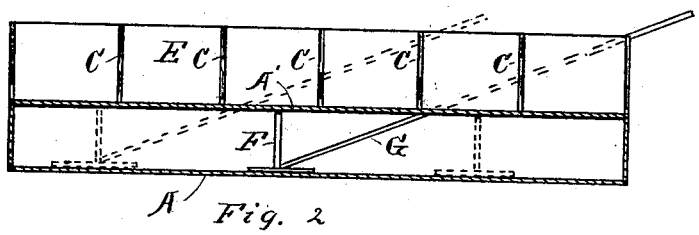
Figure 5:
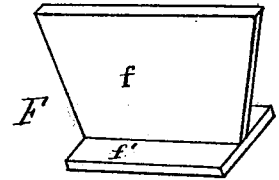

Figure 1. is a top plan of my trough. Fig. 2. is a sectional elevation of the same. Figs. 3. and 4. are vertical cross sections of the same on the line x x of Fig. 1, and Fig. 5. is a perspective of the inside partition.

Similar letters refer to similar parts throughout the several views.

Figure 4:
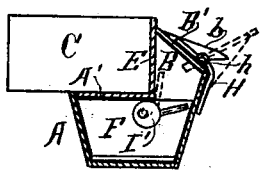

I construct my trough A. broad at the top, and narrow at the bottom, tapering, both from the back and the front sides, toward the center as indicated in Figs. 3 and 4. so that feed will settle, nearly, directly below the openings D. in the cover, the cover A' being designed to cover the entire front upper surface of the trough, and provided at intervals with openings D. of a proper size and form to allow the swine to easily insert and withdraw their heads while feeding.

For the purpose of preventing the animals from interfering with each other, when feeding, or the stronger from driving the weaker from the trough, I place a series of partitions C. between the several openings so that each animal is entirely shut off from sight of or contact with the others. Above, and back of the top I construct a back E, that projects upward to the top of the partitions, and back of this I leave an opening which may be opened and closed by means of the cover B', which cover is hinged to the back edge of the trough by means of the hinges H, or other suitable device, see Fig. 1, the pivot joint h of which is placed a little distance up from the edge of the cover so that when the cover is open, as indicated by the dotted lines in Figs. 3 and 4. the lower edge of the door will project in, over the edge of the back so that any feed that is poured upon the surface of the door will be carried well toward the center of the trough, and thus avert the danger of spilling it upon the ground, or floor back of the trough, which would exist if the pivot joints of the hinges were placed at the line of connection between the cover and the back of the trough.

For the purpose of adjusting the capacity of the trough for feeding a greater or lesser number of animals, I construct an adjustable partition F having a body $f$ made to exactly fit between the sides of the trough, and a base $f'$ made to set upon the bottom of the trough and hold the body vertical, and insure its always retaining its proper position when in place, the whole being made to fit into the trough sufficiently close to prevent the feed from passing the partition from one end of the trough to the other; and to insure close joints at the front, back and bottom of this partition, and yet render it capable of being easily and readily moved from one position to another in the trough I make it a trifle narrower, vertically, than the distance between the top A' and the bottom of the trough, and force, and secure it to place by means of an eccentric I', as in Fig. 4. though as a rule, unless very thin liquid feed is used I find that a simple pin I. passed through openings $i$ in the top and into the upper edge of the partition, as in Fig. 3. is all sufficient, and when solid feed is used, it is not necessary to use any fastening at all, as indicated in Fig. 2. but I can leave it free to be moved from place to place lengthwise of the trough, by means of a simple pole G or other suitable device.

To support the cover B', when open, I place one or more cleats $b$. upon its outer surface, of a proper form to come in contact with the back of the trough and support it in a proper position to act as a convenient slide for conducting the feed into the trough.

The partitions C may be made to extend solidly to the bottom of the trough, as in Fig. 3. or they may be cut off at the top of the trough as in Fig. 4 but should, in any case, project out beyond the front edge of the trough, as shown.

The back E forms, as well, a support for the door B. when closed, and, with the door, insures the perfect covering of the opening B as shown in Figs. 1, 3, and 4 of the accompanying drawings.

Having thus fully described my invention, what I claim as new, and desire to secure by Letters Patent of the United States, is—

1. The combination, in a feed trough, of a cover having a separate triangular opening for the introduction of the head of each animal, partitions between these openings, said partitions being entirely above and in front of the trough a solid adjustable partition within the trough, said partition fitted to form a water tight joint with the bottom and two sides of the trough, substantially as, and for the purpose set forth.

2. The combination, in a feed trough, of a cover provided with separate apertures, a partition between said apertures projecting in front of and above the trough, a back cover pivoted within the trough, a solid movable partition within the trough, and a fastening adjusted to render the joints water tight between the partition and the bottom and two sides of the trough, substantially as, and for the purpose set forth.

3. A feed trough having a cover provided with apertures, each aperture having an upwardly projecting partition at two sides and the back, a movable partition within the trough, and a device for holding said partition securely to place, substantially as shown and described.

Signed at Hopkins Station, Michigan, this 16th day of October, 1893.

WENDEL EDERLE.

In presence of—
GEO. F. NEALE,
WM. F. NEALE.